US008992369B2

United States Patent
Miller et al.

(10) Patent No.: US 8,992,369 B2
(45) Date of Patent: Mar. 31, 2015

(54) AXIAL BEARING OF PINION GEARS OF A PLANETARY GEAR SET

(71) Applicant: ZF Friedrichshafen AG, Friedrichshafen (DE)

(72) Inventors: Tobias Miller, Waldburg (DE); Frank Paulitschke, Saarlouis (DE); Stefan Brom, Friedrichsafen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 14/093,628

(22) Filed: Dec. 2, 2013

(65) Prior Publication Data

US 2014/0194244 A1   Jul. 10, 2014

(30) Foreign Application Priority Data

Jan. 10, 2013   (DE) .......................... 10 2013 200 240

(51) Int. Cl.
*F16H 57/08*   (2006.01)

(52) U.S. Cl.
CPC ........ *F16H 57/082* (2013.01); *F16H 2057/085* (2013.01)
USPC ....................................................... 475/160

(58) Field of Classification Search
USPC ....................................................... 475/160
See application file for complete search history.

(56) References Cited

U.S. PATENT DOCUMENTS

| 4,776,237 A | * | 10/1988 | Premiski et al. | ............... 475/159 |
| 6,135,910 A | * | 10/2000 | Urmaza et al. | ................ 475/159 |
| 2012/0077637 A1 | * | 3/2012 | Chen | ............................. 475/336 |

FOREIGN PATENT DOCUMENTS

| DE | 10 2004 014 578 A1 | 12/2005 |
| DE | 10 2004 047 160 A1 | 4/2006 |

* cited by examiner

*Primary Examiner* — Derek D Knight
*Assistant Examiner* — David Morris
(74) *Attorney, Agent, or Firm* — Davis & Bujold, PLLC; Michael J. Bujold

(57) ABSTRACT

An axial mounting of the planetary gearwheels of a planetary gearset having a sun gear that meshes with at least one planetary gearwheel mounted on a planetary bolt that is supported on the planetary carrier. The at least one planetary gearwheel meshes with a ring gear. At least one check-plate, which has a hole for the planetary bolt and which is positioned on one side of the planetary gearwheel between the planetary gearwheel and the planetary carrier, is associated with each planetary gearwheel. The check-plate is completely flat and is axially symmetrical relative to its longitudinal and transverse axes. The at least one check-plate has two wings that extend in the longitudinal direction, which are positioned in recesses formed in the planetary carrier, when the check-plate is in the installed condition, to secure the check-plate against rotation. The check-plate is fixed relative to the planetary carrier.

7 Claims, 2 Drawing Sheets

AXIAL BEARING OF PINION GEARS OF A PLANETARY GEAR SET

This application claims priority from German patent application serial no. 10 2013 200 240.8 filed Jan. 10, 2013.

FIELD OF THE INVENTION

The present invention concerns an axial bearing of pinion gears of a planetary gear set.

BACKGROUND OF THE INVENTION

From the prior art it is known to provide the planetary carriers of planetary gearsets with rotation-resisting check-plates for the planetary gearwheels. Theoretically the planetary gearwheels and radial needle bearings are not subjected to axial forces but nevertheless, owing to deformation and tolerances or imprecision, these components drift laterally toward the planetary carrier. In the case of steel planetary gearwheels and planetary carriers the check-plates are made of bronze or brass, whose relative movement takes place either toward the planetary gearwheel or toward the planetary carrier. With planetary carriers made of aluminum, steel check-plates with phosphates surfaces are also used, the phosphate coating serving as wear protection between the check-plate and the planetary gearwheel.

It is also known, in particular with an aluminum planetary carrier, to make the check-plates of bronze or brass and fix them relative to the planetary carrier in order to avoid drifting of the check-plates toward the planetary carrier. In this way the relative rotational speed is transferred to the planetary gearwheel so that drifting of the check-plates is prevented. In such cases the check-plates are as a rule fixed relative to the planetary carrier by means of metal bent-over straps on the check-plates.

The bending of the straps as a rule produces an unsymmetrical component which, for that reason, demands precise assembly in relation to rotation about the bolt axis and in relation to the fitting direction. On the one hand, a rotationally symmetrical design of the component facilitates its positioning in the circumferential direction during assembly; on the other hand, during assembly even with such a design, attention must be paid to the fitting direction.

DE 10 2004 014 578 A1 by the present applicant describes a planetary transmission in which an inner, central gear meshes with at least one planetary gearwheel and in turn the planetary gearwheel is in meshing engagement with a ring gear, and each planetary gearwheel is mounted on a planetary bolt supported on a planetary carrier. The known planetary transmission comprises at least one check-plate associated with the planetary gearwheel, which is positioned between the planetary gearwheel and the planetary carrier and whose geometrical shape can be chosen freely. The geometrical shape is designed such that fitting of the check-plate must take place in a fixed orientation and direction, while in the event of erroneous assembly the ring gear and/or the inner, central gear cannot be fitted.

Furthermore, DE 10 2004 047 160 A1 by the present applicant describes a planetary transmission with an outer, ring gear and an inner, central gear, wherein at least one planetary gearwheel is arranged between the ring gear and the central gear and meshes with them both, and wherein each planetary gearwheel is mounted on a planetary gearwheel bolt attached by a support to a planetary carrier, the bolts having bores for the supply of lubricant. In this known transmission, a check-plate is arranged on at least one side between the planetary gearwheel and the planetary carrier, this being provided both for the planetary gearwheel and for the support and which consists of a case-hardened metallic material coated with a tungsten-carbon carbide layer. This provides durable contact surfaces which are substantially less prone to generate heat and which extend the life of the planetary gearwheel mounting. In its assembled condition the at least one check-plate can have bent-over straps.

SUMMARY OF THE INVENTION

The purpose of the present invention is to indicate an axial mounting for the planetary gearwheels of a planetary gearset, in which check-plates fixed in relation to the planetary carrier of the planetary gearset are used, the check-plates having no straps to secure them against rotation. In addition simple assembly should be ensured and incorrect installation prevented.

Accordingly an axial mounting for the planetary gearwheels of a planetary gearset is proposed, wherein a sun gear meshes with at least one planetary gearwheel mounted on a planetary bolt which is supported on the planetary carrier, wherein the at least one planetary gearwheel meshes in turn with a ring gear and wherein at least one check-plate is associated with each planetary gearwheel of the planetary gearset, the check-plate having a hole for the planetary bolt and being arranged on one side of the planetary gearwheel between the planetary gearwheel and the planetary carrier.

According to the invention, the at least one check-plate is completely flat and is designed axially-symmetrically in relation to its longitudinal and transverse axes. Moreover, the at least one check-plate has two wings that extend in the longitudinal direction which, to prevent rotation in the assembled condition of the check-plate, fit into recesses in the planetary carrier so that the check-plate is fixed relative to the planetary carrier.

By virtue of the axially-symmetrical design of the check-plate relative to its longitudinal and transverse axes, simple assembly in the circumferential direction and indeed along both directions of the longitudinal axis of the check-plate is made possible; furthermore, by virtue of the planar design of the check-plate, the lateral alignment of the stop disk in the assembly, i.e., the mounting direction, is irrelevant.

Consequently, there are four possible fitting positions, namely two for each fitting orientation, which differ by a rotation through 180°, so that erroneous assembly, for example fitting of the check-plate rotated out of position by 90°, is excluded.

In a further development of the invention, material can be removed from positions away from the working surfaces of the check-plate, whereby in an advantageous manner on the one hand its weight, and on the other hand the effective centrifugal forces are reduced.

Furthermore, in an embodiment of the invention, in the inner area of the check-plate on both sides of the hole for the planetary bolt two lubrication pockets can be provided, which are positioned so that the cross-sections acted upon by centrifugal force are not weakened.

BRIEF DESCRIPTION OF THE DRAWINGS

Below, an example of the invention is explained in greater detail with reference to the attached figures, which show.

DETAILED DESCRIPTION OF THE PREFERRED EMBODIMENTS

Figure 1:
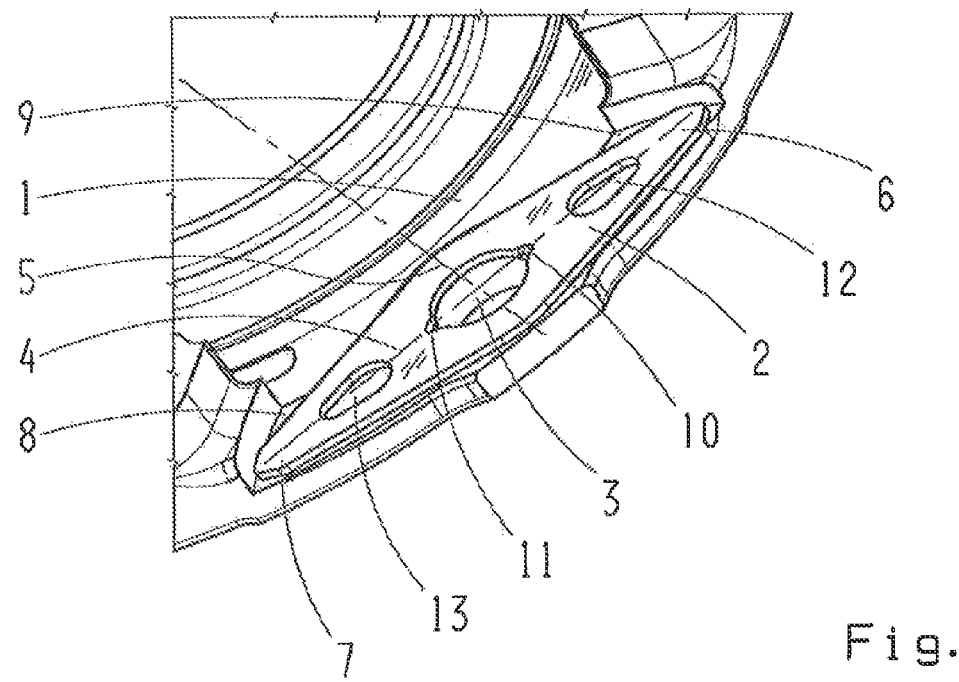
FIG. 1: A schematic perspective view of part of a planetary carrier of a planetary gearset, with a check-plate made according to the invention.
Figure 3:
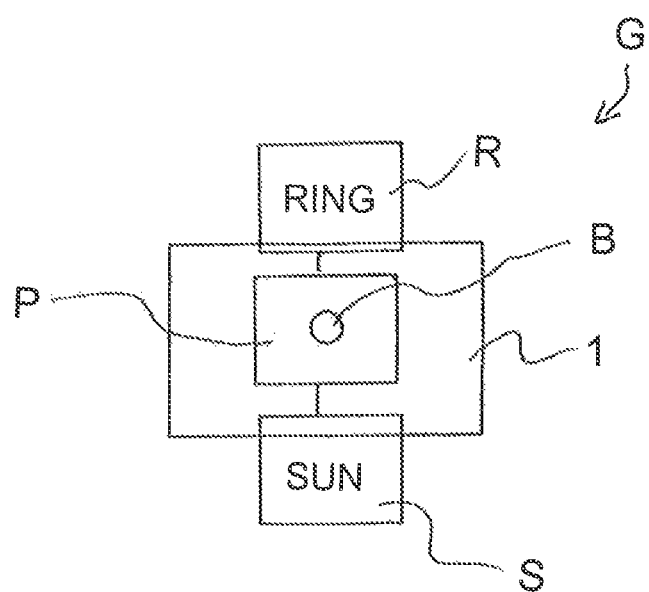
FIG. 3: A schematic view of a planetary gear set.

FIGS. 1 and 3 show a planetary carrier of a planetary gearset G, which is indexed 1. In the planetary gearset G a sun gear S meshes with at least one planetary gearwheel P, which is mounted on a planetary bolt B supported on the planetary carrier 1 and, in turn, the at least one planetary gearwheel meshes with a ring gear R, as shown in FIG. 3.

Figure 2:
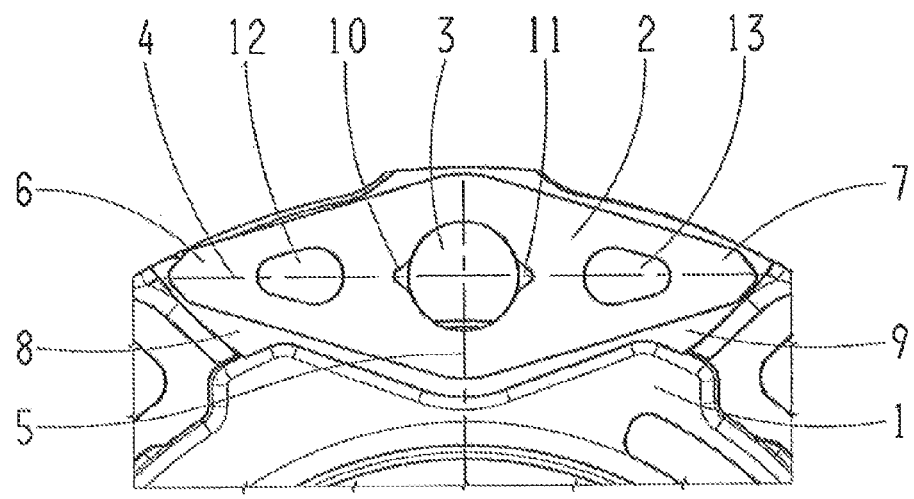
FIG. 2: A schematic top view showing part of a planetary carrier of a planetary gearset, with a check-plate made according to the invention.

According to the invention and referring to FIGS. 1 and 2, with each planetary gearwheel of the planetary gearset there is associated at least one check-plate 2, which is positioned on one side of the planetary gearwheel between the planetary gearwheel and the planetary carrier 1. Preferably two check-plates 2 are provided for each planetary gearwheel, so that on both sides of the planetary gearwheel, between it and the planetary carrier 1, there is arranged in each case a check-plate 2.

The at least one check-plate 2 has a hole 3 for the planetary bolt, is completely flat, and it is designed axially symmetrically relative to its longitudinal and transverse axes 4, 5. Preferably, the check-plate is made from a bronze or brass alloy. As a rule the planetary carrier 1 is made of aluminum.

As can be seen from FIGS. 1 and 2, the check-plate 2 has two wings 6, 7 that extend in the longitudinal direction and which, to secure the check-plate 2 against rotation when it is in its installed state, are positioned in corresponding recesses 8, 9 formed in the planetary carrier 1 so that relative to the planetary carrier 1, the check-plate 2 is fixed. Preferably, the recesses 8, 9 are produced using the same milling tool with which the recess for the planetary gearwheel itself was milled into the planetary carrier 1, whereby the production costs can be kept low.

According to a further development of the invention the recesses 8, 9 have the geometry of circular cut-outs that are not located concentrical with the planetary bolt; this ensures that rotation of the check-plate 2 is prevented.

In a further development of the invention, on both sides of the hole 3, which is formed in the check-plate 2 for the planetary bolt, there is provided in each case a lubrication pocket 10, 11, these lubrication pockets 10, 11 being positioned so that cross-sections acted upon by centrifugal force are not adversely affected.

Furthermore, away from the working surfaces of the check-plate 2, material can be cut away so that the weight of the check-plate 2 and the effective centrifugal forces are reduced. In FIGS. 1 and 2 such cut-outs are indexed 12 and 13.

Since the check-plate 2 according to the invention is completely flat and is designed axially symmetrically relative to its longitudinal and transverse axes, the check-plate 2 can be fitted along either direction of its longitudinal axis 4. Thanks to the flat design of the check-plate 2 it is also immaterial which way up it is fitted.

Consequently there are four possible fitting positions, namely two for each way up that the check-plate 2 is fitted, these differing by a rotation through 180°. Erroneous assembly, for example fitting it perpendicularly to the correct fitting direction, is prevented by the shape of the check-plate 2 according to the invention and by the recesses 8, 9 formed in the planetary carrier 1.

The concept according to the invention ensures that the check-plates are secured against rotation without the need to provide bent-over straps, whereby thanks to the four possible fitting positions assembly is simplified, resulting in a cost reduction. Moreover erroneous assembly is prevented, and this too saves costs. In addition the production costs for check-plates designed according to the invention are low.

INDEXES

1 Planetary carrier
2 Check-plate
3 Hole for the planetary bolt
4 Longitudinal axis of the check-plate
5 Transverse axis of the check-plate
6 Wing
7 Wing
8 Recess in the planetary carrier 1
9 Recess in the planetary carrier 1
10 Lubrication pocket
11 Lubrication pocket
12 Cut-out
13 Cut-out

The invention claimed is:

1. An axial mounting for planetary gearwheels of a planetary gearset comprising
a sun gear which meshes with at least one planetary gearwheel being mounted on a planetary bolt supported on a planetary carrier (1),
the at least one planetary gearwheel meshing with a ring gear,
at least one check-plate (2) being associated with each of the at least one planetary gearwheel of the planetary gearset, the at least one check-plate (2) having a circular hole (3) for receiving and engaging with the planetary bolt defining a planet gear rotational axis, and the at least one check-plate (2) being positioned on one side of the at least one planetary gearwheel, between the at least one planetary gearwheel and the planetary carrier (1),
the at least one check-plate (2) being completely flat and defining a plane which extends normal to the planet gear rotational axis, being axially symmetrical relative to both longitudinal and transverse axes (4, 5) of the at least one check-plate, and both the longitudinal and the transverse axes (4, 5) lie in the plane defined by the at least one check-plate (2);
the check-plate (2) having two opposed wings (6, 7) which extend in the longitudinal direction, along the longitudinal axis (4) of the check-plate (2), so that a longitudinal length of the check-plate (2), along the longitudinal axis (4), being greater than a transverse longitudinal length of the check-plate (2), along the transverse axis (5), and
each of the wings (6 or 7) of the check-plate (2) being accommodated within a respective recess (8 or 9) formed in the planetary carrier (1), when the check-plate (2) is in an installed condition, so the wings (6 or 7) secure the check-plate against rotation, and the check-plate (2) being fixed relative to the planetary carrier (1).

2. The axial mounting for the planetary gearwheels of the planetary gearset according to claim 1, wherein the recesses (8, 9), for the at least one check-plate (2), have a circular cut-out geometry that is not concentric with the planetary bolt.

3. The axial mounting for the planetary gearwheels of the planetary gearset according to claim 1, wherein a lubrication pocket (10, 11) is provided on both sides of the hole (3) for the planetary bolt in the at least one check-plate (2), and the lubrication pockets (10, 11) are positioned such that cross-sections, acted upon by centrifugal force, are not weakened.

4. The axial mounting for the planetary gearwheels of the planetary gearset according to claim 1, wherein the at least one check-plate (2) has cut-outs (12, 13) spaced from its working surfaces so that a weight of the check-plate (2) and effective centrifugal forces of the check-plate are reduced.

5. The axial mounting for the planetary gearwheels of the planetary gearset according to claim 1, wherein two check-plates (2) are provided for each planetary gearwheel so that a respective check-plate (2) is arranged on each sides of the planetary gearwheel, in each case, between the planetary gearwheel and the planetary carrier (1).

6. The axial mounting for the planetary gearwheels of the planetary gearset according to claim 1, wherein the at least one check-plate (2) is made from one of bronze and a brass alloy.

7. An axial mounting for planetary gearwheels of a planetary gearset comprising a sun gear, a ring gear and a planet carrier,
- each of the planetary gearwheels being supported on a respective planetary bolt that is fixed to the planetary carrier,
- each of the planetary gearwheels meshing with the sun gear and the ring gear,
- each of the planetary gearwheels being associated with at least one check-plate, each check-plate having a cylindrical hole through which the planetary bolt extends and is accommodated, the planetary bolt defining a planet gear rotational axis, and each respective check-plate being positioned on one side of the planetary gearwheel between the planetary gearwheel and the planetary carrier,
- each check-plate being flat and defining a plane which extends normal to the planet gear rotational axis, each check-plate defining a longitudinal axis and a transverse axis, the at least one check-plate being axially symmetrical relative to the longitudinal and the transverse axes, and both the longitudinal and the transverse axes (4, 5) lie in the plane defined by the at least one check-plate (2);
- the check-plate (2) having two opposed wings (6, 7) which extend in the longitudinal direction, along the longitudinal axis (4) of the check-plate (2), so that a longitudinal length of the check-plate (2), along the longitudinal axis (4), being greater than a transverse longitudinal length of the check-plate (2), along the transverse axis (5), and
- each wing of each respective check-plate being accommodated within a respective recess formed in the planetary carrier, when the check-plate is installed on the planetary carrier, so that the wings of the check-plate prevent rotation of the check-plate relative to the planet carrier.

* * * * *